UNITED STATES PATENT OFFICE.

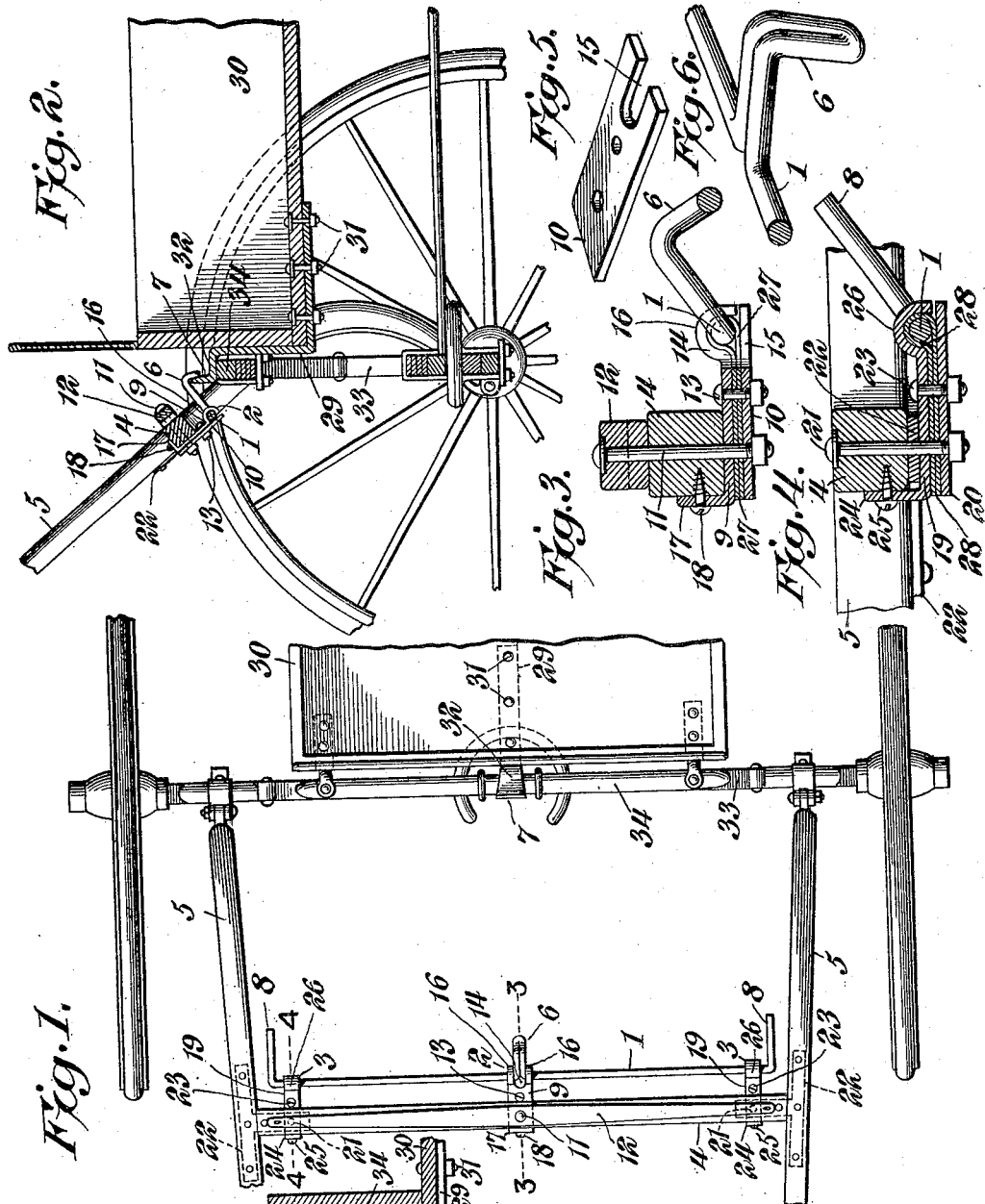

EDWARD E. ATKINSON AND CHARLES F. OVERMYER, OF NORFOLK, VIRGINIA.

VEHICLE SHAFT-SUPPORT.

1,125,036.  Specification of Letters Patent.  Patented Jan. 19, 1915.

Application filed March 7, 1914. Serial No. 823,236.

*To all whom it may concern:*

Be it known that we, EDWARD E. ATKINSON and CHARLES F. OVERMYER, citizens of the United States, residing at Norfolk, in the county of Norfolk and State of Virginia, have invented a new and useful Vehicle Shaft-Support, of which the following is a specification.

The invention relates to improvements in devices for supporting vehicle shafts and poles.

The object of the present invention is to improve the construction of vehicle shaft supports and to provide a simple, inexpensive, and efficient device of light, strong, and durable construction, designed for use on various styles of vehicles for supporting a pole or shafts elevated and out of the way, and capable of securely holding them in such position and of being readily operated at either side, without the use of operating cords to lock a pair of shafts or thills in an elevated position, and also to release the same.

A further object of the invention is to provide a shaft support of this character adapted to permit a pair of shafts to be readily released by a simple upward movement of the shafts, without manual manipulation of an operating device, whereby the shafts may be lowered for hitching a horse to a vehicle without necessitating a person releasing his grasp on the animal during such hitching operation.

It is also an object of the invention to provide a noiseless shaft support which will not rattle when the vehicle is traveling over a rough road way, and which will afford increased strength to the vehicle.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a plan view of a portion of a vehicle provided with a shaft support constructed in accordance with this invention, the shafts being lowered. Fig. 2 is a longitudinal sectional view of the same, the shafts being supported in an elevated position. Fig. 3 is an enlarged detail sectional view on the line 3—3 of Fig. 1. Fig. 4 is a similar view on the line 4—4 of Fig. 1. Fig. 5 is a detail perspective view of the lower plate or member of the central bearing bracket. Fig. 6 is a detail perspective view of the movable hook or catch. Fig. 7 is a detail view illustrating the manner of disengaging the movable hook or catch from the fixed catch or keeper.

Like numerals of reference designate corresponding parts in all the figures of the drawing.

In the accompanying drawing, in which is illustrated the preferred embodiment of the invention, 1 designates a transverse rock shaft preferably constructed of a single piece of rod metal, and mounted in central and side bearing brackets 2 and 3 located in rear of the cross bar 4 of a pair of shafts or thills 5. The transverse shaft 1, which may be constructed of relatively light rod metal, is provided with a central integral movable hook or catch 6 adapted to be conveniently formed by doubling and bending the rod metal, as clearly illustrated in Fig. 6 of the drawing, but the movable hook or catch, which is carried by the transverse shaft, may be constructed in any desired manner. The hook or catch 6 is adapted to engage with a relatively fixed catch or keeper 7, and the terminals of the transverse shaft are bent at right angles to form suitable operating handles 8 which are located at opposite sides of the vehicle within convenient reach of a person standing at either shaft 5.

The central bearing bracket comprises upper and lower plates or members 9 and 10 located beneath the cross bar 4 and secured to the same by the pivot bolt 11, which secures the swingle tree 12 of the cross bar 4. The upper and lower plates or members 9 and 10, which project rearwardly beyond the cross bar 4, are also secured together by a bolt 13, and they are provided with registering slots or bifurcations 14 and 15 to receive the movable hook or catch 6. The upper plate 9 of the bearing bracket is curved or arched at opposite sides of the bifurcation 14 to form bearing portions 16 which extend partially around the transverse shaft 1 at opposite sides of the movable hook or catch 6, and the said shaft 1 is confined in the recesses of the bearing portion 16 by the lower plate 10. The upper plate 9 is preferably provided at its front end with an upwardly extending arm or portion 17 arranged at the front face of the cross bar 4 and secured to the same by a screw 18 or other suitable fastening device.

Each of the side bearing brackets consists of upper and lower plates 19 and 20, secured beneath the end portions of the cross bar 4 by one of the bolts 21 which fastens the ends of the cross bar 4 to the braces 22, ordinarily employed for connecting the cross bar to the shafts or thills. The upper and lower plates 19 and 20 project in rear of the cross bar 4 and are secured together by a bolt 23 located in rear of the cross bar. The front end of the upper plate 19 is preferably provided with an upwardly extending portion or arm 24 fitted against and secured to the front face of the cross bar 4 by a screw 25 or other suitable fastening device. The rear or terminal portion 26 of the upper plate 19 is arched or bent to form a bearing for the transverse shaft 1, which is confined in such bearing by a rear terminal portion of the lower plate 20. In order to prevent noise and rattling of the transverse shaft 1 in the central and side bearing brackets, the latter are equipped with strips 27 and 28 of leather or other suitable material, doubled at their centers to encircle the central and terminal portions of the transverse shaft 1 and having their side portions fitted against each other to provide two plies or thicknesses interposed between the upper and lower plates of the central and side bearing brackets, and extending from the rear bearings thereof to the front ends of the brackets. The flexible strip of the central bearing bracket is bifurcated at its loop or bend to straddle the movable hook or catch. The yieldable material of the flexible strips is adapted to be slightly compressed by the nuts of the bolts of the bearing brackets, and the pressure resulting from the yieldable character of the flexible strips will tend to lock the nuts of the bolts and prevent loss of the same. Also, the flexible strips yieldably engage the journaled portions of the transverse shaft 1, and are adapted to maintain the same against free rotary movement in the bearings, and this enables the movable catch or hook to be maintained out of engagement with the fixed catch or keeper to permit the shafts to be swung downwardly when they are released, without liability of the hook dropping back into engagement with the fixed catch or keeper.

The fixed catch or keeper, which may be shaped to conform to the configuration of different styles of bodies of vehicles, preferably consists of a substantially L-shaped body or attaching portion 29 fitted against the front and bottom of the vehicle body 30, and secured at the bottom of the body by bolts 31 or other suitable fastening means and provided at the top of its front portion with an outwardly extending arm 32 which carries the catch or keeper 7. The arm 32, which projects outwardly from the front end of the body of the vehicle, is adapted to be supported by the front spring 33, and it extends from and rests upon the bar 34 to which the spring is secured, and with which the body is connected at the terminals of the said bar 34. This construction of the fixed catch or keeper is especially advantageous in the class of vehicles having the front spring 33, and the fixed catch or keeper constitutes a bracket and provides a central third connection between the body of the vehicle and the spring, thereby increasing the strength of the vehicle and relieving the body of the strain which ordinarily results from supporting the shafts or thills from a catch mounted on the body and having no connection with the running gear.

When it is desired to support the shafts or thills in an elevated position, they are swung upward to the position illustrated in Fig. 2 of the drawing, and the movable hook or catch is engaged with the upwardly projecting relatively fixed catch or keeper 7. As the transverse shaft 1 extends across the space between the shafts, the movable catch or hook may be operated at either side of the vehicle, and when it is in engagement with the fixed catch or keeper, the shank of the movable catch or hook is arranged in front of the said catch or keeper at an inclination so that the shafts or thills are adapted to be swung upwardly or rearwardly beyond such supported position, which upward or rearward movement will operate to lift the hook or catch to the position illustrated in Fig. 7 of the drawing. This action carries the bill or engaging portion of the hook or catch above the fixed catch or keeper, and the frictional engagement between the bearing bracket and the transverse shaft 1 will maintain the movable hook or catch in such disengaged position, and will enable the shafts or thills to be swung downwardly for hitching a horse to the vehicle. This will obviate the necessity of holding the catch or hook out of engagement with the fixed catch or keeper by hand, and the shafts or thills may be lifted at any point within convenient reach to release them, thereby greatly facilitating the operation of hitching a stubborn or fractious animal, and enabling the animal to be placed in proper position in front of the vehicle and the shafts or thills lowered without a person releasing his hold on the animal. When the movable hook or catch is in engagement with the fixed catch or keeper, the shafts or thills are securely supported in an elevated position out of the way, and there is no liability of the hook or catch becoming accidentally disengaged from the fixed catch or keeper.

What is claimed is:

1. A support of the class described, including a transverse shaft provided with a movable hook or catch having a shank, bearing brackets having bearings receiving the transverse shaft and provided with yieldable means for frictionally engaging the shaft to prevent free movement of the shaft in the bearings, and a fixed catch or keeper designed to be mounted on a vehicle in rear of the shaft and arranged to be engaged by the hook or catch for maintaining the shaft or pole of a vehicle in an elevated position, the shank of the hook or catch being arranged at an inclination and located in advance of the catch or keeper when the hook or catch is in engagement with the same, whereby a rearward movement of the hook or catch will lift the engaging portion thereof, which will be maintained out of engagement by the bearing brackets.

2. A support of the class described, including a fixed catch or keeper, a transverse shaft having a central hook or catch, central and side bearing brackets composed of upper and lower plates, one of the plates of each bracket being curved to form a bearing for the shaft, and the central bracket being slotted or bifurcated to straddle the wall or catch, and flexible strips secured in the brackets between the upper and lower plates and extending around the transverse shaft to prevent free movement of the same in the said bearings.

3. In a support of the class described, the combination with a vehicle including a body and a front spring extending across the body, of a movable catch or keeper, means for securing the same to a pole or a pair of shafts, and a fixed catch or keeper comprising a lower rearwardly extending portion secured to the bottom of the body, an upwardly extending portion arranged at the front of the body, and an arm extending forwardly from the vertical portion and provided with an upwardly projecting portion arranged to be engaged by the movable catch, said arm projecting over and supported by the said front spring, whereby the latter sustains the weight of the body and relieves the same of the strain of the pole or shafts.

In testimony that we claim the foregoing as our own, we have hereto affixed our signatures in the presence of two witnesses.

EDWARD E. ATKINSON.
CHARLES F. OVERMYER.

Witnesses:
WILLIAM PRACK,
WILLIAM FINLEY.